US007796812B2

(12) United States Patent
Pitie et al.

(10) Patent No.: US 7,796,812 B2
(45) Date of Patent: Sep. 14, 2010

(54) METHOD FOR MATCHING COLOR IN IMAGES

(75) Inventors: Francois Pitie, London (GB); Anil Kokaram, Wicklow (IE)

(73) Assignee: Greenparrotpictures, Limited, Wicklow (IE)

( * ) Notice: Subject to any disclaimer, the term of this patent is extended or adjusted under 35 U.S.C. 154(b) by 980 days.

(21) Appl. No.: 11/581,457

(22) Filed: Oct. 17, 2006

(65) Prior Publication Data

US 2008/0089581 A1    Apr. 17, 2008

(51) Int. Cl.
*G06K 9/00* (2006.01)

(52) U.S. Cl. ..................................... 382/162
(58) Field of Classification Search ............ 382/162, 382/164–168, 170–171; 348/672; 358/518, 358/524, 528
See application file for complete search history.

(56) References Cited

U.S. PATENT DOCUMENTS 5,543,940 A    8/1996  Sherman
5,771,311 A    6/1998  Arai
2002/0154325 A1  10/2002  Holub

FOREIGN PATENT DOCUMENTS

EP         1538826        6/2005

OTHER PUBLICATIONS

Vrhel, M, Trussell, H, "Colour Correction using Principal Components", Colour Research and Application, vol. 17, No. 5, pp. 328-338, Oct. 1992.

*Primary Examiner*—Jose L Couso
(74) *Attorney, Agent, or Firm*—Oblon, Spivak, McClelland, Maier & Neustadt, L.L.P.

(57) ABSTRACT

A method and apparatus for transforming a first color distribution based on a second color distribution. The method includes the steps of determining, for each of the first and second color distributions, a one-dimensional histogram along a direction in a color space; matching the one-dimensional histogram determined for the first color distribution and the one-dimensional histogram determined for the second color distribution so as to generate a transform mapping; transforming the first color distribution based on the generated transform mapping; and repeating the determining, matching, and transforming steps for other directions in the color space until the generated transform mapping converges.

16 Claims, 7 Drawing Sheets

FIG. 1
target image    original image    Reinhard
FIG. 2A
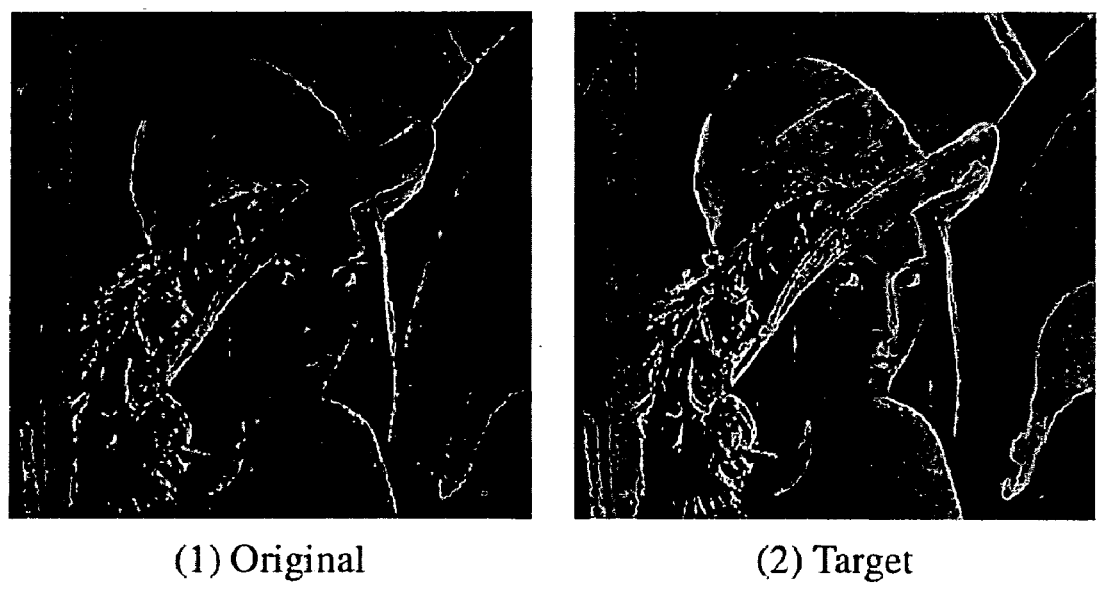
(1) Original    (2) Target
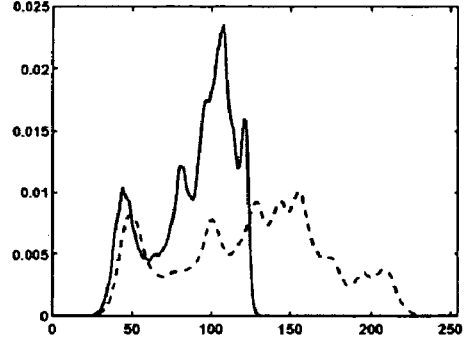
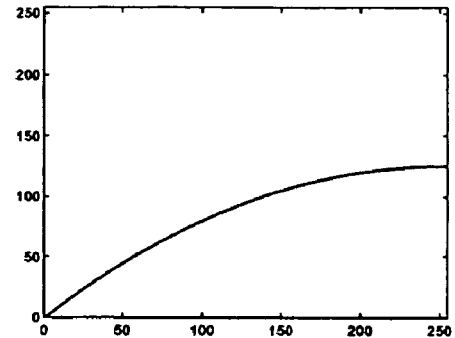
histograms    mapping
FIG. 2B (a) Target Picture  (b) Original Picture  (c) Iteration 1
(d) Iteration 2  (e) Iteration 3  (f) Final Result (a) - Original  (b) - Target  (c) - (a) after Transfer  (d) Noise Smoothing  (e) mapping FIG. 6
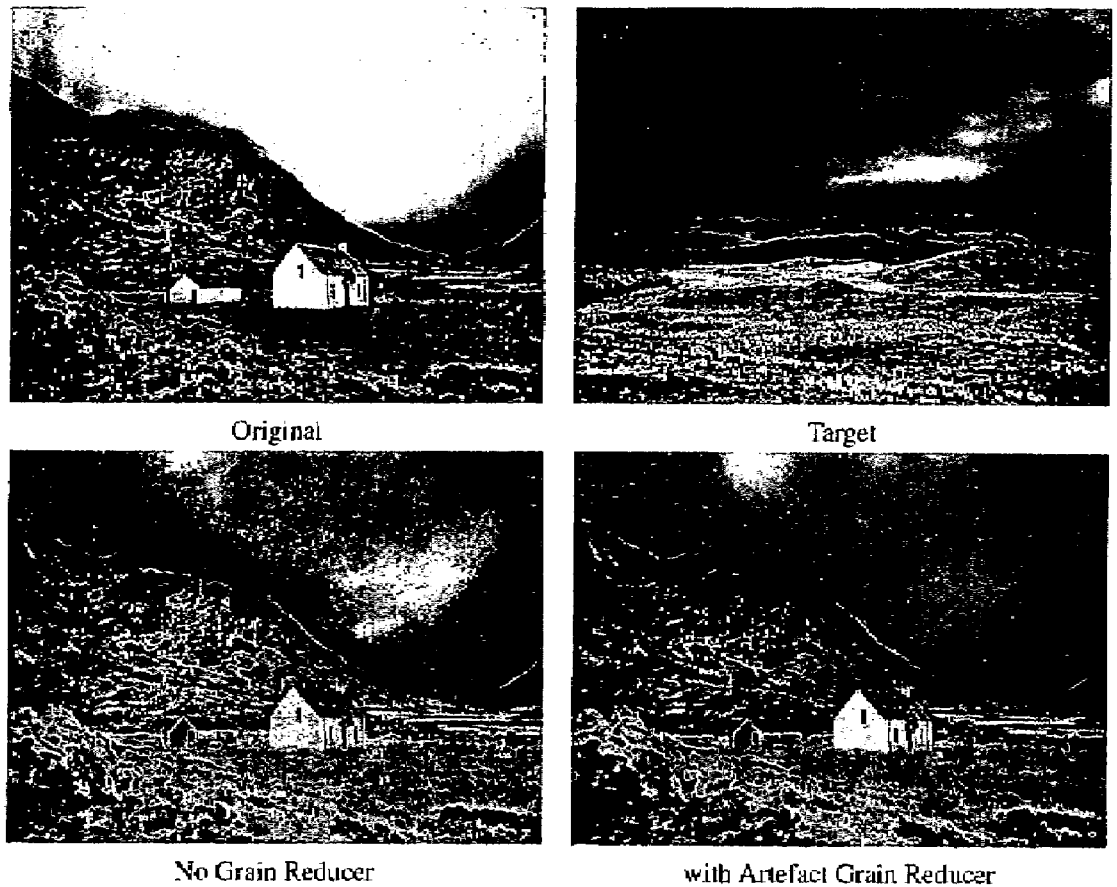
Original | Target
No Grain Reducer | with Artefact Grain Reducer
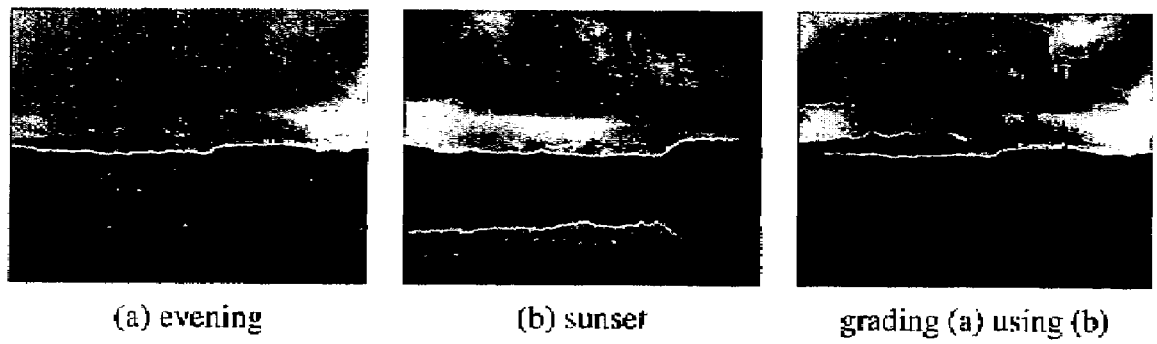
(a) evening | (b) sunset | grading (a) using (b)
FIG. 7

METHOD FOR MATCHING COLOR IN IMAGES

BACKGROUND OF THE INVENTION

Field of the Invention

The present invention relates generally to image color balancing. More specifically, the present invention relates to a new method for estimating the mapping required to transform one color distribution into another. The present invention includes the use of various technologies referenced and described in the documents identified in the following LIST OF REFERENCES:

LIST OF REFERENCES

[1] Jeff Bolz, Ian Farmer, Eitan Grinspun, and Peter Schroder. Sparse matrix solvers on the gpu: Conjugate gradients and multigrid. *ACM Transactions on Graphics*, 22(3):917-924, July 2003.

[2] Y. Chang, K. Uchikawa, and S. Saito. Example-based color stylization based on categorical perception. In *Proceedings of the 1st Symposium on Applied perception in graphics and visualization (APGV)*, pages 91-98. ACM Press, 2004.

[3] R. Fattal, D. Lischinski, and M. Werman. Gradient domain high dynamic range compression. In *Proceedings of the 29th annual conference on Computer graphics and interactive techniques (SIGGPAPH '02)*, pages 249-256, New York, N.Y., USA, 2002. ACM Press.

[4] R. C. Gonzalez and R. E. Woods. *Digital Image Processing*. Addison Wesley, 1992.

[5] Nolan Goodnight, Cliff Woolley, Gregory Lewin, David Luebke, and Greg Humphreys. A multigrid solver for boundary value problems using programmable graphics hardware. In *Graphics Hardware* 2003, pages 102-111, July 2003.

[6] nVIDIA® SDK 9.1. Video filter, available at download.developer.nvidia.com/developer/SDK.

[7] Y. Ji, H-B. Liu, X-K Wang, and Y-Y. Tang. Color Transfer to Greyscale Images using Texture Spectrum. In *Proceedings of the Third International Conference on Machine Learning and Cybernetics*, Shanghai, 2004.

[8] J. Jia, J. Sun, C-K. Tang, and H-Y. Shum. Bayesian correction of image intensity with spatial consideration. In *8th European Conference on Computer Vision (ECCV)*, 2004.

[9] Jens Kruger and Rudiger Westermann. Linear algebra operators for gpu implementation of numerical algorithms. *ACM Transactions on Graphics*, 22(3):908-916, July 2003.

[10] L. Lucchese and S. K. Mitra. a new Method for Color Image Equalization. In *IEEE International Conference on Image Processing (ICIP '01)*, 2001.

[11] J. Morovic and P-L. Sun. Accurate 3d image color histogram transformation. *Pattern Recognition Letters*, 24(11):1725-1735, 2003.

[12] P. Perez, M. Gangnet, and A. Blake. Poisson image editing. *ACM Trans. Graph.*, 22(3):313-318, 2003.

[13] E. Pichon, M. Niethammer, and G. Sapiro. Color histogram equalization through mesh deformation. In *IEEE International Conference on Image Processing (ICIP '04)*, 2003.

[14] W. Press, S. Teukolsky, W. Vetterling, and B. Flannery. *Numerical Recipes in C: The Art of Scientific Computing*. Cambridge University Press, New York, N.Y., USA, 1992.

[15] E. Reinhard, M. Ashikhmin, B. Gooch, and P. Shirley. Color transfer between images. *IEEE Computer Graphics Applications*, 21(5):34-41, 2001.

[16] D. L. Ruderman, T. W. Cronin, and C. C. Chiao. Statistics of Cone Responses to Natural Images: Implications for Visual Coding. *Journal of the Optical Society of America*, (8):2036-2045, 1998.

[17] J. Weickert, B. ter Haar Romeny, and M. Viergever. Efficient and Reliable Schemes for Nonlinear Diffusion Filtering. *IEEE Transactions on Image Processing*, 7(3):398-410, March 1998.

[18] T. Welsh, M. Ashikhmin, and K. Mueller. Transferring Color to Greyscale Images. In *Proceedings of ACM SIGGRAPH*, pages 227-280, San Antonio, 2002.

The entire contents of each reference listed in the above LIST OF REFERENCES are incorporated herein by reference.

DISCUSSION OF THE BACKGROUND

A major problem in the post production industry is matching the color between different shots possibly taken at different times in the day. This process is part of the large activity of film grading in which the film material is digitally manipulated to have consistent grain and color. The term color grading will be used specifically to refer to the matching of color. Color grading is important because shots taken at different times under natural light can have a substantially different 'feel' due to even slight changes in lighting.

Currently in the industry, color balancing is achieved by experienced artists who use edit hardware and software to manually match the color between frames by tuning parameters. For instance, in an effort to balance the red color, the digital samples in the red channel in one frame may be multiplied by some factor and the output image viewed and compared to the color of some other target frame. The factor is then adjusted if the match in color is not quite right. The amount of adjustment and whether it is an increase or decrease depends crucially on the experience of the artist. This is because it is a delicate task since the change in lighting conditions induces a very complex change of illumination. It would be beneficial to automate this task in some way. There has been no prior art targeted specifically to this problem in the film and digital video industry. However, several articles have proposed ideas that could be used.

One such idea is the transfer of color statistics. One popular variant of this method as proposed by Reinhard [15] matches the mean and variance of the target image to the source image. The transfer of statistics is performed separately on each channel. Since the RGB color space is highly correlated, the transfer is done in another colorspace defined by $\lambda \alpha \beta$ coordinates. This colorspace has been proposed in an effort to account for human-perception of color [16]. But the method is limited to linear transformations. In real applications, however, as in the motion picture industry, color grading employs routinely non-linear procedures. Hence, in a practical situation, some example-based recoloring scenarios actually require non-linear color mapping. FIG. 1 shows exactly this problem, and the method fails to transfer any useful statistics.

The problem of finding a non-linear color mapping is addressed in particular in [13] for color equalization (c.f. grayscale histogram equalization). That work proposes to deform tessellation meshes in the color space to fit to the 3D histogram of a uniform distribution. This method can be seen as being related to warping theory, which is explicitly used in [10] where the transfer of the 2D chromatic space is performed directly by using a 2D-biquadratic warping. Without having to invoke image warping, a natural extension of the 1D case is to treat the mapping via linear programming and the popular Earth-Mover distance [11]. The major disadvantage of the method is that (1) the mapping is not continuous and (2) pixels of the same colors may be mapped to pixels of different colors, which require random selection. Furthermore, the computational cost becomes intractable if a very fine clustering of the color space is desired.

Other ideas put forward in the literature deal with content variations. One important aspect of the color transfer problem is the change of content between two pictures. Consider a pair of images of landscapes, but in one picture the sky covers a larger area than the other. When transferring the color from one picture to the other therefore, the sky color may be applied also to parts of the scenery on the ground in the other. Because all color transfer algorithms are sensitive to variations in the areas of the image occupied by the same color, they risk overstretching the color mappings and thus producing unbelievable renderings. To deal with this issue, a simple solution (presented in [15]) is to manually select swatches in both pictures and thus associate color clusters corresponding to the same content. This is tantamount to performing manual image segmentation, and is simply impractical for a large variety of images, and certainly for sequences of images.

One automated solution is to invoke the spatial information of the images to constrain the color mapping [7, 8, 18]. In an extreme situation, color from a colored image may be required to be transferred to a grayscale image. Hence similarities between spatial neighborhoods of the two pictures are then the only way to create a color transfer operation automatically. This is a computationally demanding solution. Another automated solution is to restrict the variability on the color mapping. For example in [2], the pixels of both images are classified in a restricted set of basic color categories, derived from psycho-physiological studies (red, blue, pink, etc. . . . ) The color transfer ensures, for instance, that blue-ish pixels remain blue-ish pixels. This gives a more natural transformation. The disadvantage is that it limits the range of possible color transfers.

SUMMARY OF THE INVENTION

An object of the present invention is to estimate a color mapping that will transform a first (source) color distribution into a second (target) color distribution via matching operations. The following are considered to be novel aspects of the invention, which can be used either separately or in combination with known methods.

According to a first aspect, the invention uses multiple one-dimensional histogram matching operations. These one-dimensional histograms are derived from projections along multiple directions in the color space.

According to another aspect of the invention, each one-dimensional histogram matching operation is preferably non-linear. The net effect of using multiple one-dimensional histogram matching operations is therefore a non-linear transformation of color space.

The invention is preferably iterative using successive one-dimensional histogram matching operations preferably until the one-dimensional histograms of both the source and target images match within some predefined error.

In a preferred variant, the invention uses exclusively one-dimensional histogram manipulation instead of multidimensional as in [10, 11, 13], and is iterative.

When compared to methods described, for example, in [7, 8, 18], the present invention does not require spatial information of the form described in those publications.

According to a variant of the present invention, the method is known to converge. Particularly it will yield a final color distribution without further intervention or change of operation in a finite time.

The method is preferably completely non-parametric and is very effective at matching arbitrary color distributions.

The method preferably uses the raw image data to create the histograms required. Hence, for this variant of the invention, direct measurements from the image are sufficient to use the method, which does not rely on mathematical models or assumptions. In other words, the color distribution can be gained directly from the image without introducing additional parameters or making use of explicit models or assumptions.

In a further preferred variant, the invention is combined with a noise removal stage. This reduces the grain artifact caused by many histogram matching tools. As a consequence, the method yields an improved quality of the output image.

Though partly based on known methods, a preferred variant of the noise removal step of the present invention includes the novel element of constraining the gradients in the output image to be close to those in the input image. It will be understood by a person skilled in this area that this step can be employed independently of the matching aspect of the invention as described above.

The invention has the advantage of being completely automatic and, hence does not require user interaction during execution. In particular, there is provided an automated method for transforming a first color distribution based on a second color distribution, comprising: (1) determining, for each of the first and second color distributions, a one-dimensional histogram along a direction in a color space; (2) matching the one-dimensional histogram determined for the first color distribution and the one-dimensional histogram determined for the second color distribution so as to generate a transform mapping; (3) transforming the first color distribution based on the generated transform mapping; and (4) repeating the determining, matching, and transforming steps for other directions in the color space until the generated transform mapping converges.

BRIEF DESCRIPTION OF THE DRAWINGS

The present invention is described in conjunction with the appended figures, wherein:

FIG. 1 is an example (right image) of color transfer using Reinhard's Color Transfer [15] illustrating how the transfer of a source image (center image) fails to re-synthesize the color scheme of the target image (left image), and that human interaction is required to make the process successful;

FIG. 2 is an example of a one-dimensional (1D) pdf transfer on grayscale pictures with FIG. 2A showing a source and a target image, and FIG. 2B showing the source and target histograms and a matching function that can transform pixels from the source to match the histogram of the target;

FIG. 6 illustrates the result of noise smoothing for a color picture with the details of the picture being preserved, while the spurious graininess in sky has been washed out; and FIG. 7 is an example of employing the novel color grading process for matching lighting conditions by using the color properties of the sunset to synthesize the 'evening' scene depicted at sunset in accordance with an embodiment of the present invention.

DETAILED DESCRIPTION OF THE PREFERRED EMBODIMENTS

Figure 3A:
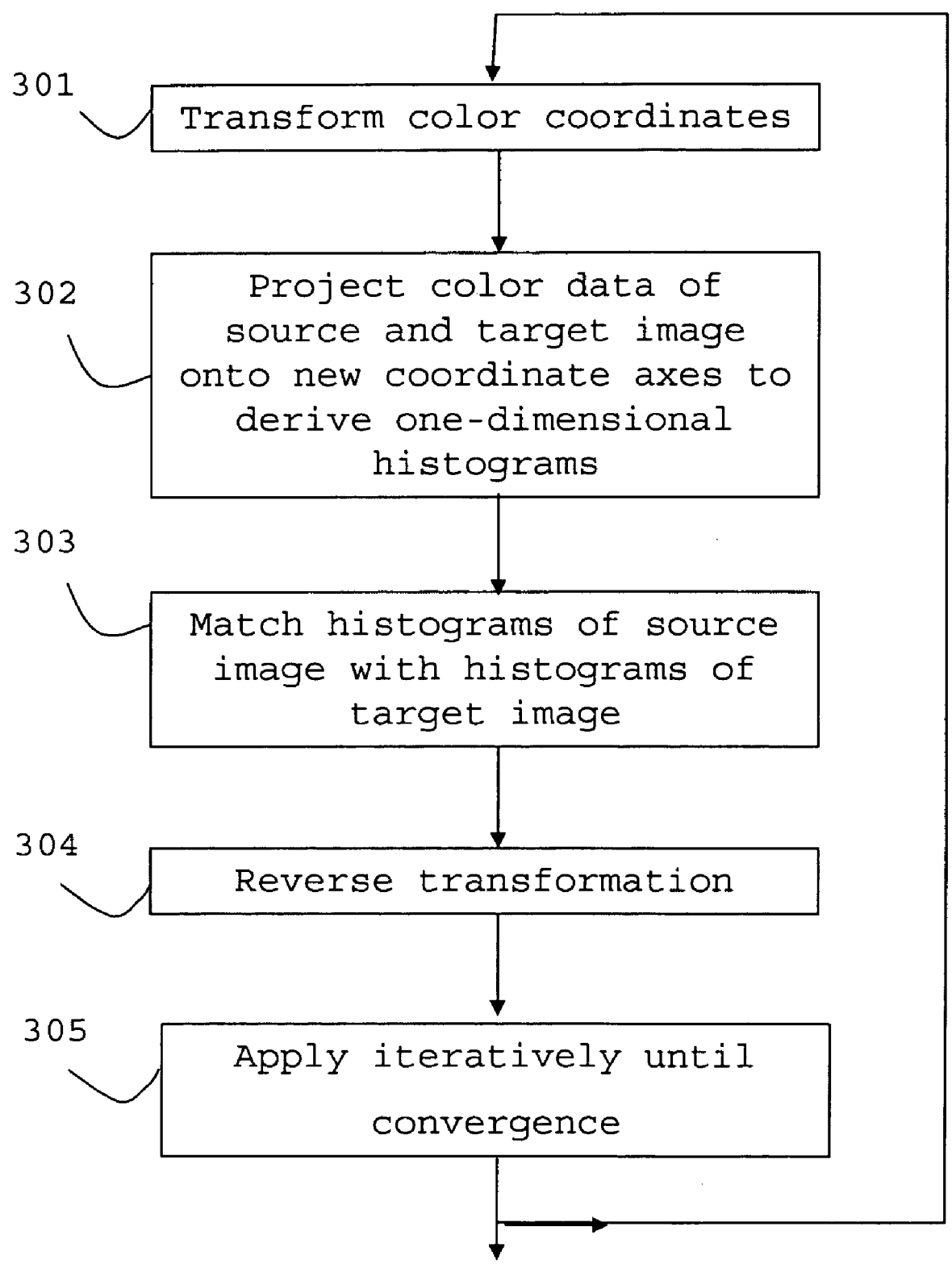
FIGS. 3A-3D illustrate a outline flow diagram (FIG. 3A) and various stages of a more detailed flow chart (FIGS. 3B-3D) with the first part of the process being optional, but capable of handling very effectively linear transformations, whilst the second step of the process can handle any non-linear transformation and at the end of the iterations, when no more improvement is visible, the two set of samples share the exact same statistics; while using this process for matching colors in images, a grain artifact can appear and the noise smoothing module is used to address this problem.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks.

An embodiment of the present invention is a process for automating the color grading or color balancing task even when the lighting conditions have dramatically changed, as shown in FIG. 1. It resolves many of the problems with previous work and is computationally extremely efficient. Its implementation based on the below description in dedicated or purposely designed circuitry is possible, but an implementation exploiting the Graphics Subsystem of general purpose processors is described as a more economic manner of implementing the present invention.

Considering now the task of transferring the color from target image (left) to source image (center) in FIG. 1. One simple approach is to separately match the red, green and blue channels using the standard 1D histogram matching technique. After one iteration of this matching process, there is no further change in the mapping since the 1D histograms no longer change. Typically this methods yields a poor result, as shown in image on the right of FIG. 1.

One aspect of this invention is to notice that if a colorspace transformation (a rotation of the colorspace) is applied to the color data between each iteration of 1D matching, this causes the entire color surface distribution of the center image of FIG. 1 to eventually warp into the shape of the color distribution of the target image on the left of FIG. 1. The image on the right of FIG. 1 shows the final color transfer appearance in which source image has been colored with the colors in the target image.

It is an important observation for the purpose of present invention to note that even if a random sequence of rotations is used, the process converges eventually to a valid picture with some successful color transfer properties.

In addition, it was found that the transformation need not be a rotation, although other transformations may be less efficient.

The invention proposes in this example that if 1D slices of the multidimensional color space are matched independently, eventually the entire multidimensional surface will be mapped effectively. To understand this aspect of the invention, it may be beneficial to discuss some background on image histograms.

An image histogram can be understood as the frequency distribution of color in the image. The histogram of a gray scale image is 1D because pixels assume only scalar values of gray—typically from 0 to 255 for instance. FIG. 2B shows this. The histogram of a color image is 3D because each pixel has associated with it 3 values for red, green and blue (in RGB space), or luminance, and two color components (in YUV space).

Matching 1D histograms is a well understood process and used in histogram equalization for instance. For example, in case of the two gray scale images shown in FIG. 2A it may be required to transfer the brightness distribution of the target image on the right to the source image one on the left. To do so requires mapping each of the 256 gray scale values in the image on the right to some other grayscale value such that the resulting brightness of source image is the same as target image. A technique for creating this mapping is well known [4]. A process may be represented as the following steps.

1. Set the histogram of the target image to be stored in some memory array $H_1$ such that the $n^{th}$ element of that array is $H_1[n]$ for n=0:255 elements. Similarly set the histogram of source image 2 to be $H_2[n]$. Both distributions are shown in FIG. 2B.

2. Calculate the cumulative density functions $C_1$, $C_2$ by summing the elements of each memory array. Hence calculate $$C_1[n] = \sum_{m=1}^{n} H_1[m] \text{ and}$$

$$C_2[n] = \sum_{m=1}^{n} H_2[m]$$

3. Create the required grayscale mapping by scanning the elements of $C_1$ and mapping the grayscale of each entry in $C_1$ to the grayscale value that indexes the value having the least difference in $C_2$ For each m=0:255

Find that value of n which makes $|C_1[m]-C_2[n]|$ smallest. Define this value as T[m].

The mapping for m is then T[m]

The result is then an array T[m] which contains, for each element m=0:255, a corresponding number that is the grayscale to be assigned. The mapping is shown in FIG. 2B. To apply the transformation to source image then, each pixel in the source image is visited and its grayscale, I say, is used to look up in T[m] to yield the new grayscale. Hence for a pixel of grayscale I the new grayscale to be assigned is T[I].

There are variants on this process of course, but the above serves as a mechanism for achieving 1-D histogram matching. The resulting image should then have an intensity distributed similarly to the target image.

Unfortunately, the above method fails for color images because there are more dimensions involved. A naive approach based on the grayscale process above would be to separate each color component (red, green and blue) and match the histograms of each color plane individually. An example of doing this is shown in FIG. 1. The match is clearly poor.

However, it is an aspect of the current invention that the above approach can be successful by transforming (step 301) the color space before performing the histogram matching (steps 302 and 303), and then repeating this process iteratively 305, as shown in the diagram of FIG. 3A. To return to the original colorspace, the rotation is then undone in step 304 or reversed after each mapping. In other words by applying the matching operation for multiple directions, i.e., more that just the three conventional axes, in the color space until the changes to the pixels are no longer significant, even color images can be successfully matched.

Figure 3B:
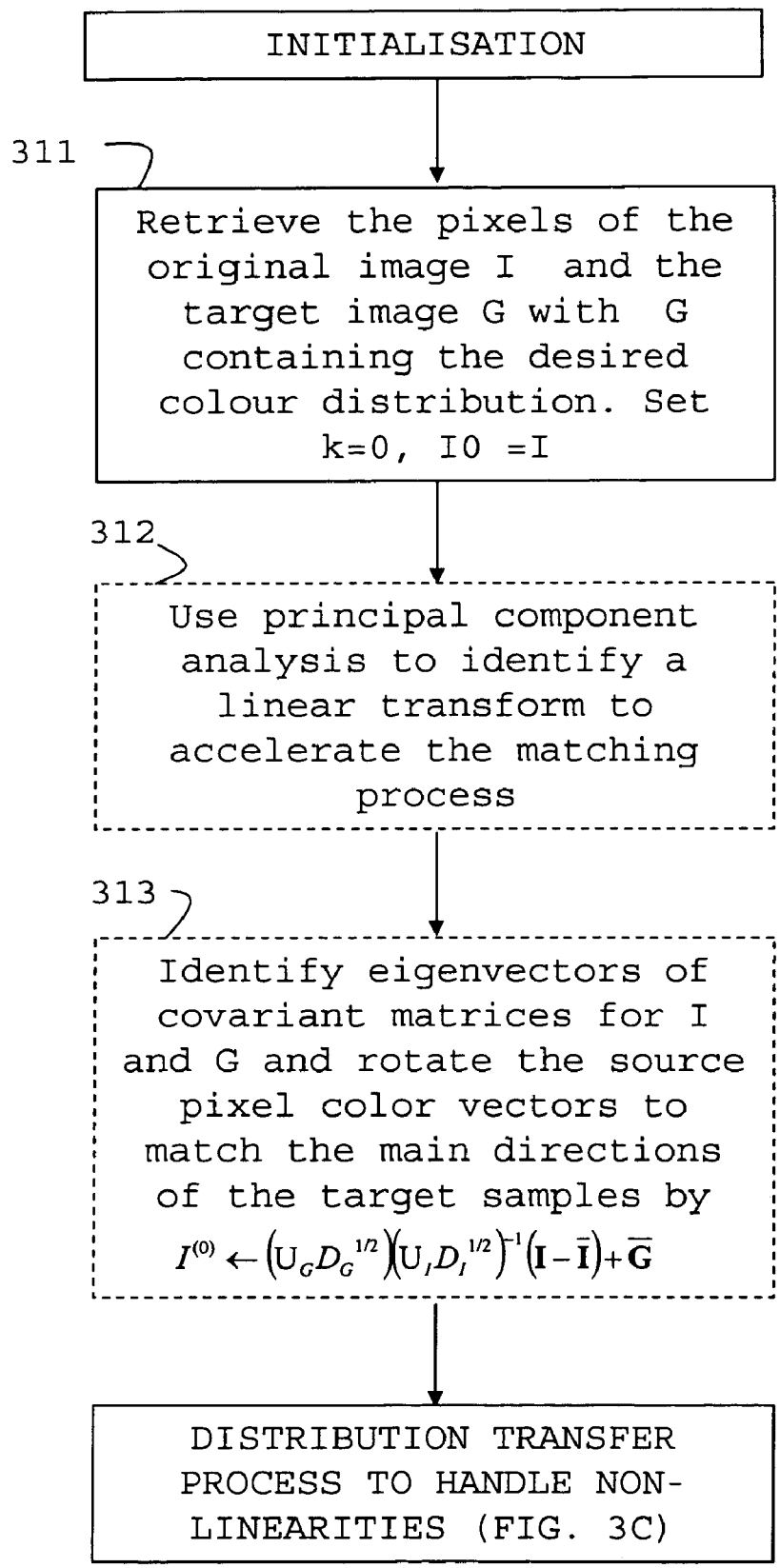
Figure 3C:
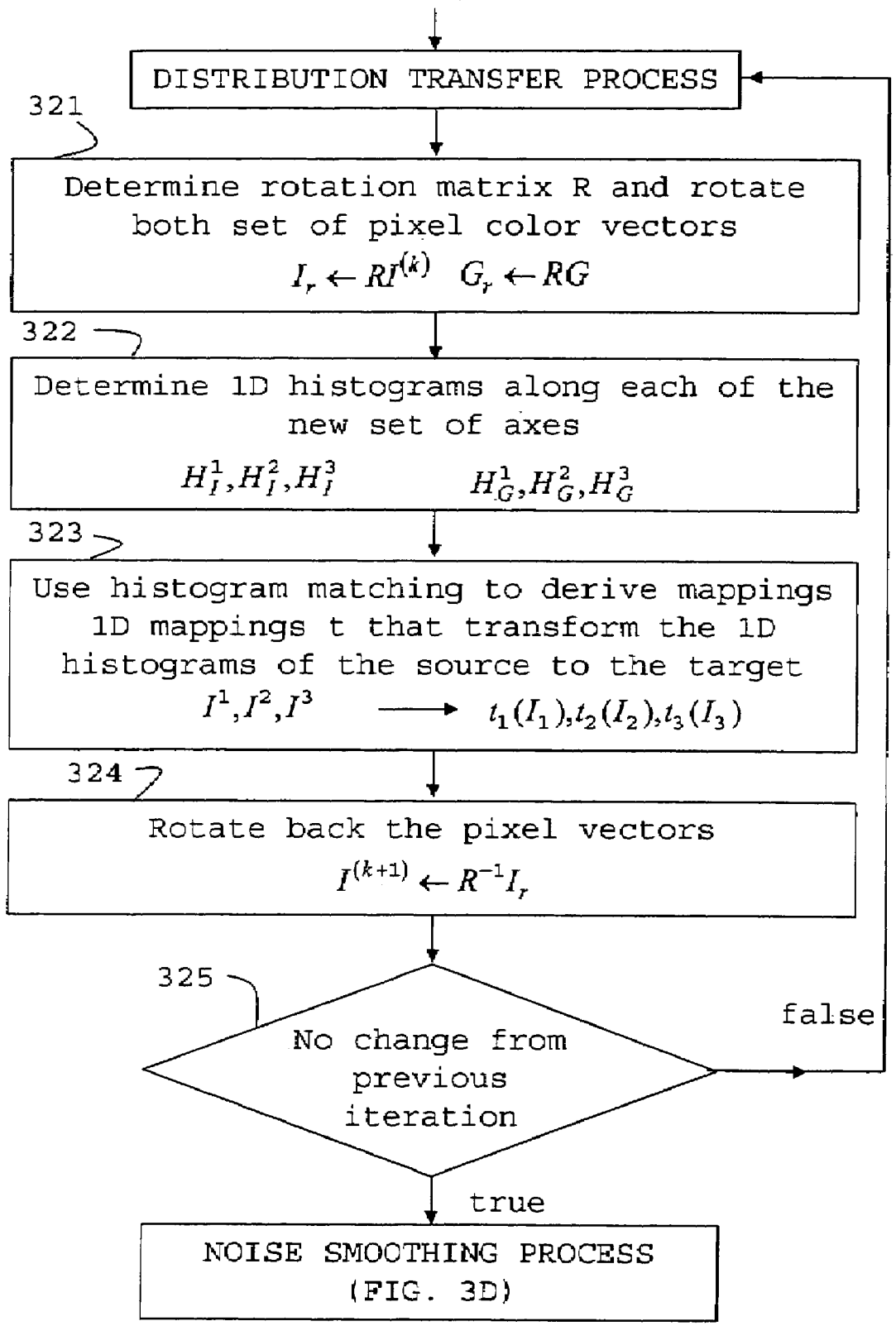

The central part of the process outlined above is illustrated in greater detail in FIG. 3C. There it is assumed that, after some pre-processing to be described below when referring to FIG. 3B, the process has moved to an arbitrary iteration k. The image pixels involved are the current image $I^{(k)}$ (which has been transformed up to iteration k) and the image data from G, the target image. G is the image containing the color distribution that is required. The first step 321 of the iteration is to change the coordinate system by rotating both the color of the samples of $I^{(k)}$ and the samples of G.

Defining this rotation operation as R:

$$R = \begin{pmatrix} 1 & 0 & 0 \\ 0 & \cos(\alpha) & \sin(\alpha) \\ 0 & -\sin(\alpha) & \cos(\alpha) \end{pmatrix} \begin{pmatrix} \cos(\beta) & 0 & -\sin(\beta) \\ 0 & 1 & 0 \\ \sin(\beta) & 0 & \cos(\beta) \end{pmatrix} \quad (1)$$

$$\begin{pmatrix} \cos(\gamma) & \sin(\gamma) & 0 \\ -\sin(\gamma) & \cos(\gamma) & 0 \\ 0 & 0 & 1 \end{pmatrix}$$

for some angles $\alpha$, $\beta$, $\gamma$, then each pixel color vector $I^{(k)}=(r, g, b)$ is transformed in $I^{(k)}=(r', g', b')$ as follows $$\begin{pmatrix} r' \\ g' \\ b' \end{pmatrix} = R \begin{pmatrix} r \\ g \\ b \end{pmatrix} \quad (2)$$

This operation is can be also referred to as a color space conversion rotating one set of axes in the color space into different set of axes in color space.

In a second step 322, the samples of both distributions are projected onto the new axis by summing in the relevant direction. Hence summing along the transformed red and green color axes yields a projection along the transformed blue axis. This yields three histograms for the three color planes in each sequence. These histograms for the new axes are defined as $H_I^1$, $H_I^2$, $H_I^3$ and $H_G^1$, $H_G^2$, $H_G^3$ for the current and target image, respectively.

Then it is possible using the 1D process above to find, in the next step 323, for each axis 1, 2, 3, the mappings $t_1$, $t_2$, $t_3$ that transform the histograms $H_I^1$, $H_I^2$, $H_I^3$ into $H_G^1$, $H_G^2$, $H_G^3$. The resulting transformation t maps a pixel of color $I_1$, $I_2$, $I_3$ onto $t(I_1,I_2,I_3)=(t_1(I_1),t_2(I_2),t_3(I_3))$.

The iteration is completed with a rotation in step 324 of the samples by $R^{-1}$ to return in the original coordinate system.

When no new iterations can modify the iterated samples of $I^{(k)}$, the process is considered to have converged in step 325 to the final solution and the color statistics of $I^{(k)}$ and G are identical.

The process described above is not restricted to 3 dimensions. It can be applied to vector spaces of any dimensionality. The basic steps described above remain the same, the only difference is that the rotation matrices fit the relevant dimension, i.e., for a vector space of 4 dimensions, the rotation matrix becomes a 4×4 matrix etc.

A full process according to an example of the invention includes an initialization step 311 and optional steps 312, 313 to accelerate the process as shown in FIG. 3B. This full process includes the following steps.

INTIALIZATION: Retrieve the pixels of the original image I and the target image G with G containing the desired color distribution. For example, the image pixel $I=(I_1,I_2,I_3)$ encapsulates the red, green and blue components. Set k←0, $I^{(0)}$←I.

REPEAT:
  a. Take one rotation matrix R;
  b. Rotate the pixels samples: $I_r$←$RI^{(k)}$ and $G_r$←RG;
  c. Project the samples on all 3 axis to get the histograms $H_I^1$, $H_I^2$, $H_I^3$ and $H_G^1$, $H_G^2$, $H_G^3$;
  d. For each axis i, find the 1D transformation $t_i$ that matches the histograms $H_I^1$, $H_I^2$, $H_I^3$ into $H_G^1$, $H_G^2$, $H_G^3$;
  e. Remap the pixels colors $I_r$ according to the 1D transformations. For example, a sample $(I_1, I_2, I_3)$ is remapped into $(t_1(I_1), t_2(I_2), t_3(I_3))$;
  f. Rotate back the pixel colors to the original color space: $I^{(k+1)}$←$R^{-1}I_r$
  g. k←k+1

2. UNTIL convergence on all histograms for every possible rotation

Although the above method can be applied to any kind of mapping, it might be desirable as a first step 312, 313 to use a different technique for registering global transformations between the two distributions. In particular, the novel method is not naturally designed to find rotation between the original and target dataset. This is not to be confused with the rotations used in the PDF transfer process of FIG. 3C. The rotation considered here is the rotation between the two distributions, whereas the rotations mentioned in the PDF transfer process above are applied to both distributions and only describe a change of coordinate system. The linear mapping that we are looking for in these optional steps of FIG. 3B is of the form G=AI+b.

A simple solution to this problem is to use the Principal Component Analysis 312 of each of the images.

$$(I-\bar{I})^t(I-\bar{I})=U_I^t D_I U_I \quad (3)$$

and $$(G-\bar{G})^t(G-\bar{G})=U_G^t D_G U_G \quad (4)$$

where $U_I=[u_I^1,u_I^2,u_I^3]$ and $U_I=[u_G^1,u_G^2,u_G^3]$ are the 3×3 orthogonal matrices containing the eigenvectors of the covariance matrices of the pixel color vectors of I and G. The diagonal matrices $D_I$ and $D_G$ contain the eigenvalues corresponding to the eigenvectors in $U_I$ and $U_G$.

Registering the pixel colors vectors of $I^{(0)}$ to the target distribution G is then possible by employing the following linear transformation process 313:

$$I^{(0)} \leftarrow (U_G D_G^{1/2})(U_I D_I^{1/2})^{-1}(I-\bar{I})+\bar{G} \quad (5)$$

The color distribution of the image $I^{(0)}$ shares the average value, variance and global color directions with the target image G. This operation cannot handle non-linear transformations but offers an accelerated process if it is used as a first step, i.e., before the actual pdf transfer process.

To obtain a correct transformation, the eigenvectors in $U_I$ and $U_G$ have to correspond. This is achieved by ordering them with respect to the magnitude of the corresponding eigenvalues and making sure that they do not point in opposite directions. i.e.

$$\forall i \leq 3, {}^t u_I^i \cdot u_G^i > 0 \quad (6)$$

Figure 5:
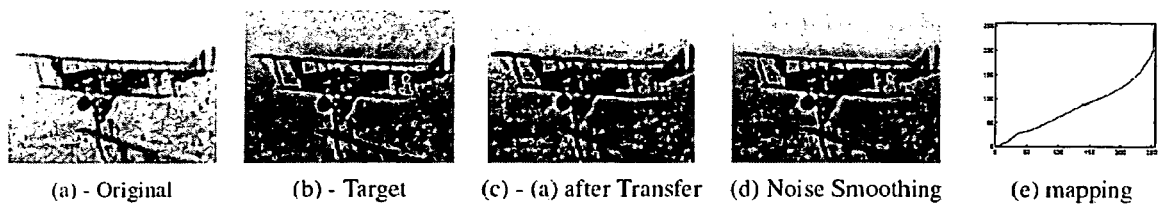
FIG. 5 illustrates the result of noise smoothing on grayscale images where two consecutive archive frames (a) and (b) suffer from extreme brightness variation and the corresponding mapping transformation (e) is overstretched resulting in an increased level of noise on the mapped original frame (c) whilst the proposed grain artifact reducer is able to reproduce the noise level of the original picture though leaving the top of the original picture saturated and not retrieved but succeeding in preserving the soft gradient in image (d)

The color mapping to the original picture transfers correctly the target color palette to the original picture but it might also produce some grain artifacts, as shown in FIG. 5. When the content differs or the dynamic range of both pictures is too different, the resulting mapping function can be stretched on some parts (see particularly FIG. 5), and thus enhances the noise level.

This effect can be understood by taking the simple example of a linear transformation t of the original picture X: t(X) →aX+b. The overall variance of the resulting picture is changed to var(t(X))=a var(X). Hence a greater stretching (a>1) produces greater noise.

Figure 3D:
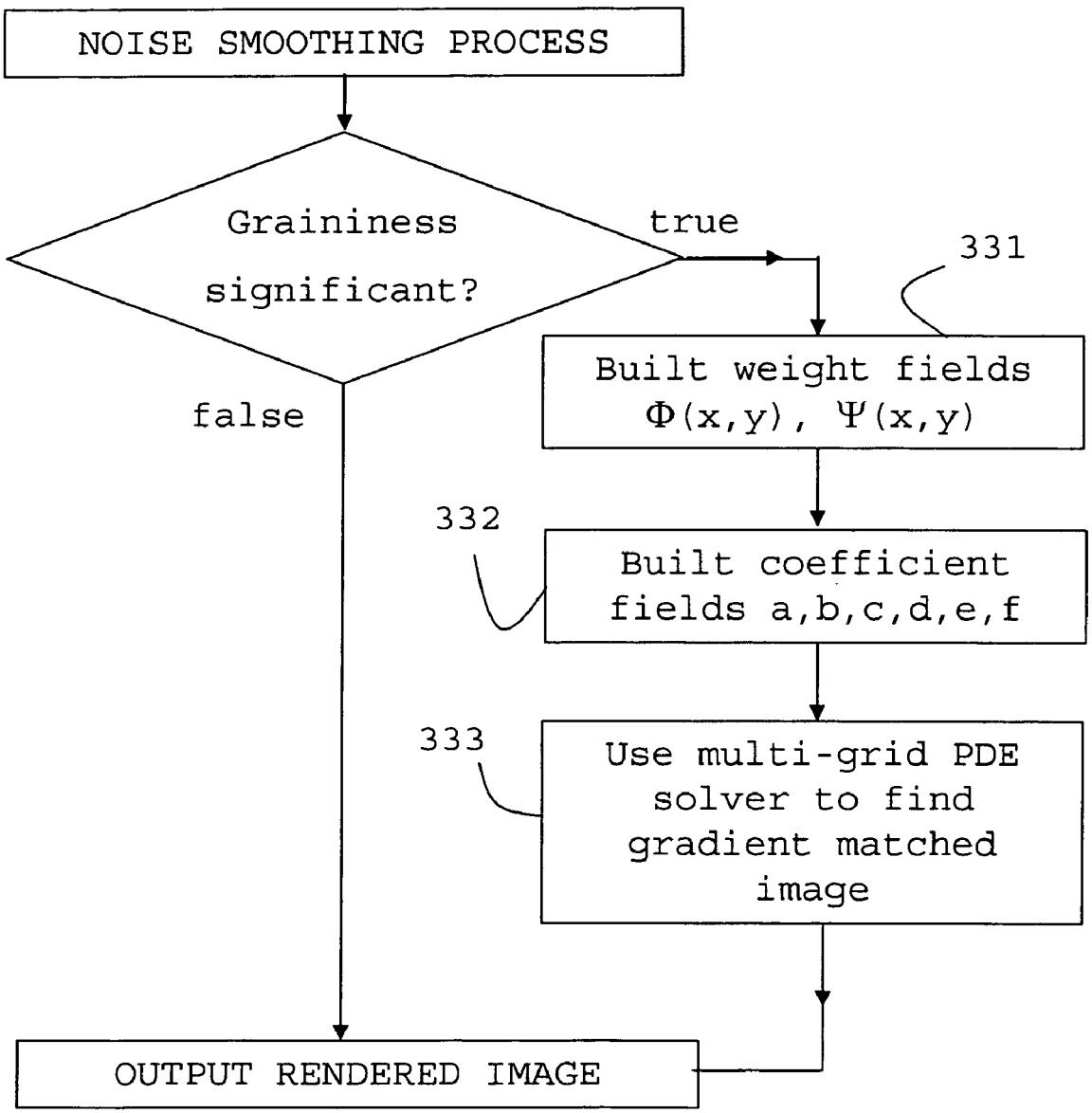
Figure 4:
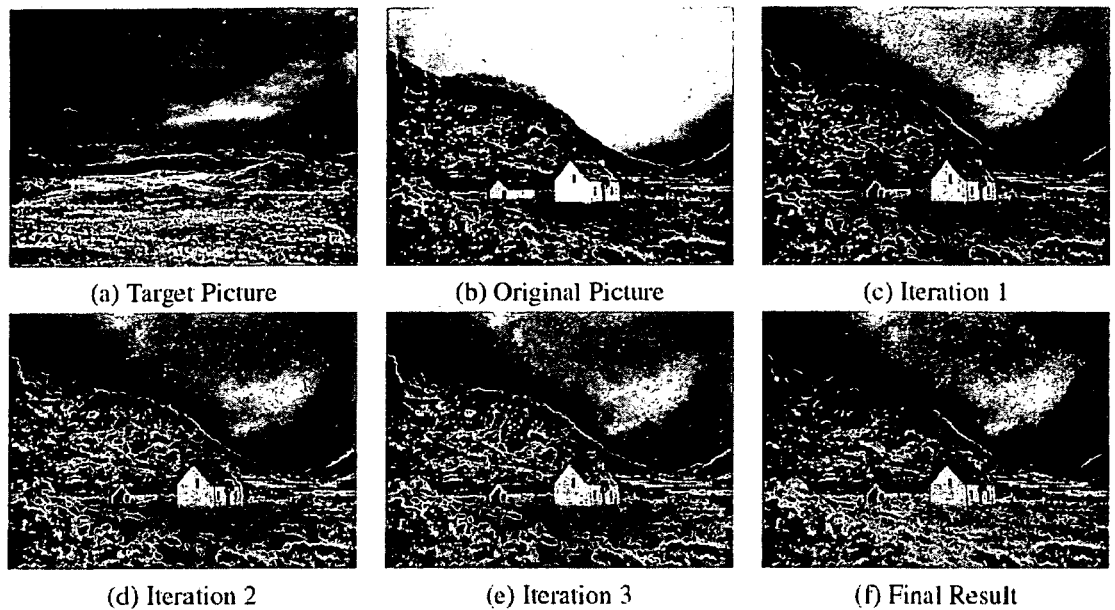
FIG. 4 is an example of the new color transfer process as applied to a target image (a) and a source image (b) picture using three iterations (c-e), with the final result (f) having the same color distribution as the target image (a)

A solution to this noise problem in accordance with an variant of the present invention is to reduce the grain by executing a post-processing process, as shown in FIG. 3D, that forces the level of noise to remain the same or approximately the same. In its most basic form, this variant includes the step 333 of adjusting the gradient field of the picture result so that it matches the original picture. If the gradient of both pictures are similar, the level of noise will be the same or at least approximately the same. Matching the gradient of a picture has been addressed in different applications such as image stitching [12] or high dynamic range compression [3], and it can be efficiently solved using a variational approach to be described in the following.

Denoting as I(x,y) the original picture and omitting the coordinates in the expressions to simplify the following discussion, i.e. I, J, $\psi$, $\phi$, etc. actually refer to I(x,y), J(x,y), $\psi$(x,y) and $\phi$(x,y), the color transformation is t:I→t(I). The problem posed by the above solution is to find a modified image J of the mapped picture t(I) that minimises on the whole picture range $\Omega$ the expression $$\min_J \int\int_\Omega \phi \cdot \|\nabla J - \nabla I\|^2 + \psi \cdot \|J - t(I)\|^2 \quad (7)$$

$$F=\phi \cdot \|\nabla J - \nabla I\|^2 + \psi \cdot \|J-t(I)\|^2$$

from which the following can be derived:

$$\phi \cdot J - \text{div}(\psi \cdot \nabla J) = \phi \cdot t(I) - \text{div}(\psi \cdot \nabla I) \quad (12)$$

This is an elliptic partial differential equation. The expression div($\Psi \cdot \nabla I$) can be approximated using standard finite differences as in [17] by:

(13)

$$\text{div}(\psi \cdot \nabla I) \approx \sum_{l \in N_i} \frac{\psi_l + \psi_i}{2}(I_l - I_i)$$

where $N_i$ corresponds to the four neighboring pixels of i.

This yields the following linear system of step 332:

$$a(x,y)J(x,y-1)+b(x,y)J(x,y+1)+c(x,y)J(x-1,y)+d(x,y)J(x+1,y)+e(x,y)J(x,y)=f(x,y) \quad (14)$$

with with Neumann boundary condition $\nabla J|_{\partial\Omega}=\nabla I|_{\partial\Omega}$ to match the gradient of J with the gradient of I at the picture border. The term $\|CJ-CI\|^2$ forces the image gradient to be preserved. The term $\|J-t(I)\|^2$ ensures that the colors remain close to the target picture. Without $\|J-t(I)\|^2$, a solution of expression (7) will be actually the original picture I.

The weight fields $\phi$ and $\psi$ affect the importance of both terms of expression (7). Numerous expressions for $\psi$ and $\phi$ are possible. For example, the weight field $\phi$ can emphasize that only flat areas have to remain flat but that gradient can change at object border, in which case:

$$\phi = \frac{\phi_0}{1+\|\nabla I\|} \quad (8)$$

(with $\Phi_0$ constant). A possible choice 331 for the weight field $\psi$ is to account for the possible stretching of the transformation t. Where $\nabla t$ is big, the grain becomes more visible:

$$\psi = \frac{\psi_0}{1+\|(\nabla t)(I)\|} \quad (9)$$

where $\Psi_0$ is constant and $(\nabla t)(I)$ refers to the gradient of t for the color I.

The minimization problem of expression (7) can be solved using the variational principle which states that the integral must satisfy the Euler-Lagrange equation:

$$\frac{\partial F}{\partial J} - \frac{d}{dx}\frac{\partial F}{\partial J_x} - \frac{d}{dy}\frac{\partial F}{\partial J_y} = 0 \quad (10)$$

where

-continued $$a(x, y) = -\frac{\psi(x, y-1) + \psi(x, y)}{2} \quad (11)$$

$$b(x, y) = -\frac{\psi(x, y+1) + \psi(x, y)}{2}$$

$$c(x, y) = -\frac{\psi(x+1, y) + \psi(x, y)}{2}$$

$$d(x, y) = -\frac{\psi(x+1, y) + \psi(x, y)}{2}$$

$$e(x, y) = \frac{1}{2}(4\psi(x, y) + \psi(x, y-1) + \psi(x, y+1) + \psi(x-1, y) + \psi(x+1, y)) + \phi(x, y)$$

$$f(x, y) = \frac{1}{2}(\psi(x, y) + \psi(x, y-1))(I(x, y-1) - I(x, y)) + (\psi(x, y) + \psi(x, y+1))(I(x, y+1) - I(x, y)) + (\psi(x, y) + \psi(x-1, y))(I(x-1, y) - I(x, y)) + (\psi(x, y) + \psi(x+1, y))(I(x+1, y) - I(x, y))) + \phi(x, y)I(x, y)$$

The final process is identical to a two-dimensional infinite impulse response (2D IIR) filter in which the coefficients a, b, c, d, e and f only dependent on the original picture I and the mapped picture t(I) and which thus can be computed beforehand. The unknown result picture J can be solved by standard iterative methods 333 like SOR, Gauss-Seidel with multigrid approach. Implementations of these numerical solvers are widely available and one can refer for instance to the respective numerical recipes [14].

FIG. 5 illustrates the result of noise smoothing on grayscale images where two consecutive archive frames (a) and (b) suffer from extreme brightness variation and the corresponding mapping transformation (e) is overstretched resulting in an increased level of noise on the mapped original frame (c) whilst the proposed grain artifact reducer is able to reproduce the noise level of the original picture, though leaving the top of the original picture saturated and not retrieved but succeeding in preserving the soft gradient in image (d).

FIG. 6 illustrates the result of noise smoothing for a color picture with the details of the picture being preserved, while the spurious graininess in sky has been washed out.

FIG. 7 is an example of employing the novel color grading process for matching lighting conditions by using the color properties of the sunset to synthesize the 'evening' scene depicted at sunset in accordance with an embodiment of the present invention.

The main step of these methods is to solve iteratively for J(x,y) as follows.

(15)

$$J^{(k+1)}(x, y) = \frac{1}{e(x, y)}(f(x, y) - a(x, y)J^{(k)}(x, y-1) - b(x, y)J^{(k)}(x, y+1) - c(x, y)J^{(k)}(x-1, y) - d(x, y)J^{(k)}(x+1, y))$$

The main computational demands in the first step of the full process are the colorspace conversion and the look up table for mapping pixels. In the second noise smoothing step, the solution of the system requires a substantial amount of spatial processing. It is possible to propose the use of Graphics Hardware from companies such as NVIDIA and ATI to provide a hardware embodiment.

An efficient system can be created by using a general purpose CPU for control and data management while employing the Graphics subsystem for data processing. The main subsystems are proposed as below.

It is well known that Graphics Processing Units (GPU's) can perform multiply/add operations on images [6]. Colorspace conversion is in particular built in as a function on chips from NVIDIA and ATI. The calculation of RI in equation (2) can be performed on such chips directly.

The creation of the 1D mapping look up table can be performed using LUT operations on the GPU. The entire image can be mapped in a single operation using the GPU functionality.

It is well known that all the fundamental operations required for Gauss-Seidel Multigrid optimization can be performed on the GPU [1, 9]. A process description has been previously presented in [5]. That module can be used with minimal change for this application.

It is not required to present all the details of the GPU programming needed to achieve the above, as such programming is considered to be well within the scope of an ordinarily trained person in the relevant field when being taught the steps as described above. This programming implementation will change with generations of GPUs and generations of tool development kits. However, currently, the GPU represents a readily available cheap computational resource that can be taken advantage of for the purpose of implementation the present invention. With the processes as outlined above, frame rates at near real time are achieved with current hardware.

All embodiments of the present invention conveniently may be implemented using a conventional general purpose computer or micro-processor programmed according to the teachings of the present invention, as will be apparent to those skilled in the computer art. Appropriate software may readily be prepared by programmers of ordinary skill based on the teachings of the present disclosure, as will be apparent to those skilled in the software art.

A computer may implement the methods of the present invention, wherein the computer housing houses a motherboard which contains a CPU, memory (e.g., DRAM, ROM, EPROM, EEPROM, SRAM, SDRAM, and Flash RAM), and other optional special purpose logic devices (e.g., ASICS) or configurable logic devices (e.g., GAL and reprogrammable FPGA). The computer also includes plural input devices, (e.g., keyboard and mouse), and a display card for controlling a monitor. Additionally, the computer may include a floppy disk drive; other removable media devices (e.g. compact disc, tape, and removable magneto-optical media); and a hard disk or other fixed high density media drives, connected using an appropriate device bus (e.g., a SCSI bus, an Enhanced IDE bus, or an Ultra DMA bus). The computer may also include a compact disc reader, a compact disc reader/writer unit, or a compact disc jukebox, which may be connected to the same device bus or to another device bus. Examples of computer readable media associated with the present invention include compact discs, hard disks, floppy disks, tape, magneto-optical disks, PROMs (e.g., EPROM, EEPROM, Flash EPROM), DRAM, SRAM, SDRAM, etc. Stored on any one or on a combination of these computer readable media, the present invention includes software for controlling both the hardware of the computer and for enabling the computer to interact with a human user. Such software may include, but is not limited to, device drivers, operating systems and user applications, such as development tools. Computer program products of the present invention include any computer readable medium which stores computer program instructions (e.g., computer code devices) which when executed by a computer causes the computer to perform the method of the present invention. The computer code devices of the present invention may be any interpretable or executable code mechanism, including but not limited to, scripts, interpreters, dynamic link libraries, Java classes, and complete executable programs. Moreover, parts of the processing of the present invention may be distributed (e.g., between (1) multiple CPUs or (2) at least one CPU and at least one configurable logic device) for better performance, reliability, and/or cost.

While detailed descriptions of one or more embodiments of the invention have been given above, various alternatives, modifications, and equivalents will be apparent to those skilled in the art without varying from the spirit of the invention. Moreover, except where clearly inappropriate or otherwise expressly noted, it should be assumed that the features, devices and/or components of different embodiments can be substituted and/or combined. Thus, the above description should not be taken as limiting the scope of the invention, which is defined by the appended claims.

What is claimed is:

1. A method implemented by a computer programmed as a color transformation apparatus for transforming a first color distribution based on a second color distribution, comprising:
    determining, for each of the first and second color distributions, a one-dimensional histogram along a direction in a color space;
    matching, by the color transformation apparatus, the one-dimensional histogram determined for the first color distribution and the one-dimensional histogram determined for the second color distribution so as to generate a transform mapping;
    transforming the first color distribution based on the generated transform mapping; and
    repeating the determining, matching, and transforming steps for other directions in the color space until the generated transform mapping converges.

2. The method of claim 1, wherein the repeating step is performed at least three times such that the matching step is performed for at least four directions in the color space.

3. The method of claim 1, wherein the repeating step comprises determining whether the generated transform mapping converges by comparing the one-dimensional histogram determined for the first color distribution and the one-dimensional histogram determined for the second color distribution.

4. The method of claim 3, further comprising:
    applying a transformation to the first and second color distributions between each iteration.

5. The method of claim 4, wherein the transformation is a rotation.

6. The method of claim 1, wherein the matching step comprises matching the one-dimensional histograms using a cumulative histogram.

7. The method of claim 1, further comprising:
    obtaining the first color distribution from a source image; and
    obtaining the second color distribution from a target image.

8. The method of claim 7, further comprising:
    noise smoothing the transformed source image.

9. The method of claim 8, further comprising:
    constraining gradients in the source image to be close to gradients in the target image.

10. The method of claim 8, further comprising:
    minimizing a weighted sum of a squared difference of image gradients between a desired noise reduced image and the target image, and a weighted sum of squared differences between said desired noise reduced image and the transformed source image.

11. The method of claim 7, further comprising:
    rendering the transformed source image using a graphics processing unit.

12. The method of claim 11, wherein the graphics processing unit is programmed to perform color space transformation, the method further comprising:
    mapping input pixels into output pixels using a look-up-table embedded in said graphics processing unit.

13. The method of claim 1, further comprising:
    using principal component analysis based on the first and second color distributions.

14. An apparatus for transforming a first color distribution based on a second color distribution, comprising:
    means for determining, for each of the first and second color distributions, a one-dimensional histogram along a direction in a color space;
    a physical memory device storing the one-dimensional histograms;
    means for matching the one-dimensional histogram determined for the first color distribution and the one-dimensional histogram determined for the second color distribution so as to generate a transform mapping;
    means for transforming the first color distribution based on the generated transform mapping; and
    means for causing the repeated execution of the means for determining, means for matching, and means for transforming for other directions in the color space until the generated transform mapping converges.

15. The apparatus of claim 14, further comprising a graphics processing unit.

16. A computer program product embedded on a computer-readable medium, the computer program product including instructions which, when executed by a computer, cause the computer to transform a first color distribution based on a second color distribution by performing the steps of:
    determining, for each of the first and second color distributions, a one-dimensional histogram along a direction in a color space;
    matching the one-dimensional histogram determined for the first color distribution and the one-dimensional histogram determined for the second color distribution so as to generate a transform mapping;
    transforming the first color distribution based on the generated transform mapping; and
    repeating the determining, matching, and transforming steps for other directions in the color space until the generated transform mapping converges.

* * * * *